United States Patent
Henderson et al.

[11] 3,910,701
[45] Oct. 7, 1975

[54] METHOD AND APPARATUS FOR MEASURING LIGHT REFLECTANCE ABSORPTION AND OR TRANSMISSION

[76] Inventors: George R. Henderson, 6217 Picardie Road, Miraleste, Calif. 90732; David A. Grafton, 427 Palisades Ave., Santa Monica, Calif. 90402

[22] Filed: July 30, 1973

[21] Appl. No.: 384,026

[52] U.S. Cl. .................. 356/39; 250/226; 356/73; 356/173; 356/201; 356/209
[51] Int. Cl.² ........................................ G01N 33/16
[58] Field of Search .......... 356/39, 40, 41, 51, 173, 356/180, 201, 209, 211, 226, 73; 250/226

[56] References Cited
UNITED STATES PATENTS

| | | | |
|---|---|---|---|
| 2,706,927 | 4/1955 | Wood | 356/41 |
| 3,439,175 | 4/1969 | Kammuller | 356/51 X |
| 3,679,314 | 7/1972 | Mustert | 250/226 X |
| 3,697,179 | 10/1972 | Pfaffenberg et al. | 356/73 |
| 3,734,631 | 5/1973 | Justice et al. | 356/51 X |
| 3,744,919 | 7/1973 | Babb | 356/173 X |

*Primary Examiner*—Ronald L. Wibert
*Assistant Examiner*—Matthew W. Koren

[57] ABSTRACT

A method and apparatus for measuring light reflectance, absorption and/or transmission having a plurality of light emitting diodes (LEDs) arranged to direct light emissions toward a test piece, with the various diodes being selected to emit light of different wavelengths and at least one light-responsive sensor disposed to receive light reflected and/or transmitted by the test piece and originating with each of the light-emitting diodes. Electrical drive circuit means are provided for alternately or sequentially energizing the plurality of LEDs of different wavelengths, such that the reflected or transmitted light received by the sensor is a function of the various wavelengths of the respective LEDs. In one embodiment, the sensor is operative to generate an output signal indicative of the characteristics of the test piece as a function of the different wavelengths of the LEDs which signal is processed to provide a display of the "differential" light reflectance, transmission and/or absorption characteristics of the workpiece and the wavelengths of the LEDs. In another embodiment, a plurality of LEDs each having a different frequency is operative to generate a range of signals which provide a measurement of reflectance, transmission and/or absorption as a function of the wavelengths of the various LEDs employed. The plurality of LED sources and the sensor may be mounted within a self-contained module which may be detachably connected to an instrument housing containing the drive and output circuitry and display means, such that a number of different source modules may be provided each having LEDs of unique wavelength with the various modules being interchangeable to permit a wide variety of measurement frequencies.

11 Claims, 7 Drawing Figures

METHOD AND APPARATUS FOR MEASURING LIGHT REFLECTANCE ABSORPTION AND OR TRANSMISSION

BACKGROUND

In general, the present invention relates to photometrics and more particularly to method and apparatus for measuring reflectance, transmission and/or absorption of light at specific wavelengths. For example, such measurements may involve the determination of relative light reflectance of different test objects at a specific wavelength, differential reflectance of one test object at two different wavelengths, and the light absorption and transmission parameters corresponding to these relative and differential measurements.

The utility of such light measurements has been demonstrated in a number of fields. One important application involves the analysis of biological specimans. Studies have been conducted which indicate that certain biological characteristics of plant and animal life can be monitored by sensing the photometric parameters of the specimen. For example, the water content of plant life or other vegetation can be functionally related to the reflectance, absorption and transmission of light at specific wavelengths. Knowing this relationship, differential reflectance of a plant specimen at two different light wavelengths can be used to measure the water content of the specimen which in turn is a determinative factor of the health of the plant. Thus, the light measurements can be employed as a means for sensing diseased or unhealthly plants.

Other applications of differential reflectometry may extend to the testing and analysis of materials in general. Material testing for production inspection and quality control is one example. The materials which may be tested according to this technique may include plastics, fabrics, wood materials, paper, coatings, food, etc.

In the biological or medical field, differential reflectometry may be employed to measure the oxygen content in blood and the water content in human or animal skin. Research indicates that these and other specific measurements may result in the ability to detect human disease by comparing photometric parameters of a healthy human subject with those from a patient of unknown health.

Using a plant leaf as one example, it can be shown that certain plant leaves exhibit a relatively low light reflectance in the visible spectrum, and a relatively high reflectance in the infrared spectrum. The work of Myers, Victor I., *Soil, Water, and Plant Relations*, "REMOTE SENSING," National Academy of Sciences, 1970, includes a relative reflectance curve for a cotton leaf as a function of wave length. This reflectance curve undergoes a drastic variation in the event of loss of water content in the mesophyl of the leaf.

In particular, changes in the curve will be exhibited at light wavelengths where the physical phenomena relating to the reflectance of light by water predominate. Thus, there are wavelengths which are differentially affected by the water content of the plant leaf, and these wavelengths can be identified. In the present example, the light frequencies undergoing the greatest change as a function of plant water content are principally in the infrared range. At these infrared wavelengths there exist absorption bands at which very distinct narrow wavelength bands of energy absorption are present. These are due to the atomic and molecular spin-resonance or vibration absorption of light quanta. In the above-mentioned study, it was established that a "wet" leaf of healthy water content exhibited sharp absorption bands at approximately the 1,500 and 2,000 nanometer wavelengths, whereas a "dry" leaf having a shortage of water content lacked these absorption points.

It is from these measurements and others that valuable information can be derived concerning the differences between healthy and unhealthy plant life. In general, such reflectance measurements can presently be obtained by instruments known as reflectometers. These devices can measure the amplitude of light-reflectance at any selected narrow band of light by tuning the light wavelength to the value of interest and measuring the reflectance thereat.

However, these devices have limitations which limit their usefulness to laboratory-type measurements. Because of the numerous variables which affect the reflectance, absorption and transmission of light relative to a test piece, accurate and meaningful light measurements have heretofore relegated the use of the reflectometer to laboratory situations where most if not all the variables can be carefully controlled.

Furthermore, these existing instruments require sophisticated and complex optical parts including such components as rotatable prisms, various types of filters, high-power light sources, delicate controls, etc. Such construction greatly limits the usefulness of the instruments for practical non-laboratory measurements.

Accordingly, it is one object of the present invention to provide an instrument which overcomes the limitations of the known laboratory-type reflectometers. In particular, the instrument of the present invention provides for eliminating most if not all of the variables normally encountered in the measurement of light reflectance by conventional techniques.

Another object of the present invention is to provide for measurement of light reflectance, absorption and/or transmission at specific wavelengths by method and apparatus capable of being used in the field, that is outside of the closely controlled conditions of a laboratory.

Another object of the present invention is to provide the foregoing light measurements by a portable instrument having no moving parts or delicate optical components such as are presently required in laboratory-type devices.

It is also an object of the present invention to provide such an instrument at a substantially lower cost than that of the laboratory reflectometer.

It is a further general object of the present invention to provide a method and apparatus for measuring light reflectivity, absorption and/or transmission characteristics of test materials at selected wavelengths in order to detect, identify, quantify or analyze the light parameters at any one or more of the selected wavelengths.

These and other objectives of the invention are provided by a photometric instrument having a plurality of light emitting diodes (LEDs) disposed to direct light emissions toward a test object or material, with the various diodes being selected to emit light of different frequency or wavelength. Also included on the instrument is a light-responsive sensor arranged to receive the light which is reflected from or transmitted through the test object from the diode sources. In order to develop differential or relative light measurements of the test object at different light wavelengths, the individual light emitting diodes are alternately or sequentially energized by an electrical drive circuit means. The difference between measurements registered by the light sensor in response to the various wavelengths is automatically determined by means of further electrical circuitry and registered on a output display means, such as a meter.

By taking the difference between measured light reflectance at various wavelengths and measured light transmission at the same wavelengths, a light absorption value is provided for the frequencies involved.

In this manner, comparative measurements of light transmission, reflection and/or absorption at different and specific wavelengths may be performed. A wide variety of applications exist for an instrument of the capability, including photometric analysis of blood samples and biological specimens and more generally in the evaluation of all kinds of materials.

In one particular and preferred embodiment of the invention, the plurality of LED sources and the light responsive sensor are mounted within a self-contained module, of size and shape similar to a camera lens, and wherein this module is detachably connected to a portable housing for the instrument. The housing contains the drive and output circuitry and the display means for the instrument and includes an electrical connector or receptacle for receiving the LED and sensor module. In this manner, a number of different source modules may be provided for each instrument housing, each module having light emitting diodes of unique wavelengths, with the various modules being interchangeable to meet the requirements of a variety of desired photometric applications.

Such an instrument provides method and apparatus for performing accurate light measurements by a relatively low cost device and without requiring the closely controlled laboratory conditions usually attendant the more expensive measurements equipment. In particular, the present invention lends itself to performing "differential reflectance" measurements in which many, if not most, of the variables are eliminated. In an absolute reflectance measurement, distinguished from differential reflectance, these variables can produce a large amplitude of errors in the measurement which is likely to invalidate the results.

Furthermore, this preferred embodiment of the present invention is advantageous in that it has no moving parts or delicate optical components, does not require a high power or energy source to operate, may be packaged in a light-weight and compact portable housing, and is capable of being mass manufactured at a relatively low cost.

The foregoing summary and the above-mentioned objects, features and advantages of the preferred embodiment of the present invention will be more fully understood by those skilled in the art from a consideration of the following detailed description. As part of this description, reference will be made to the appended sheets of drawings in which:

DESCRIPTION

Figure 1:
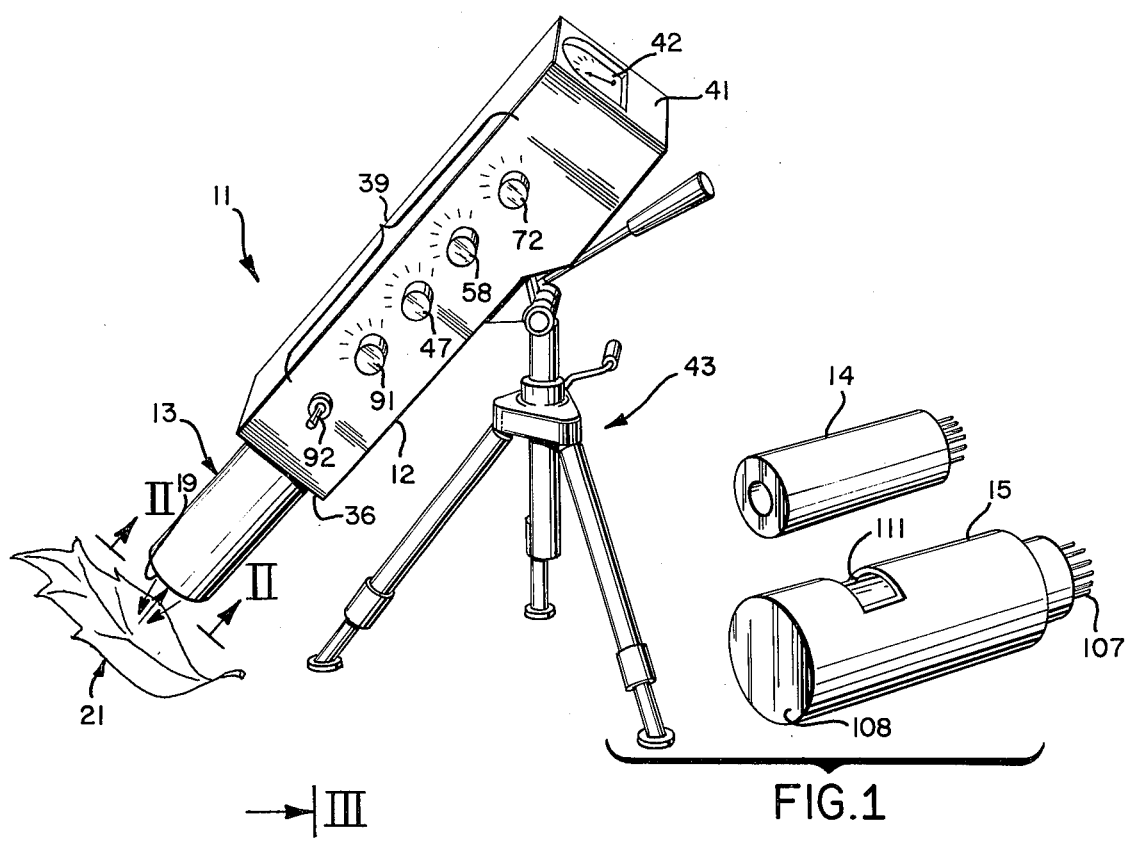
FIG. 1 is a perspective view of an instrument for measuring light reflectance, absorption and/or transmission in accordance with one particular and preferred embodiment of the present invention, illustrating the detachable and interchangeable light source and sensor modules.
Figure 2:
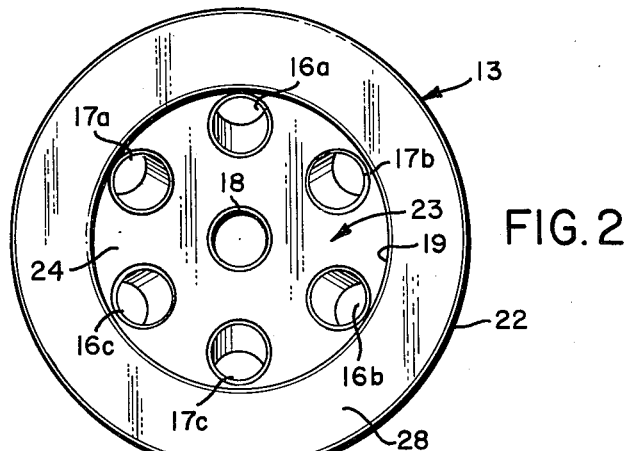
FIG. 2 is a front elevation view taken from II—II of FIG. 1 illustrating the arrangement of light emitting diodes and a light sensor within the detachable module.

With reference to FIG. 1, this particular embodiment of the present invention provides a photometric instrument 11 for measuring light reflectance, absorption and/or transmission of a test piece or test object at different light wavelengths and includes an instrument housing 12 and one or more light emitting diode and sensor modules 13, 14 and 15. To generate the light emissions at various, desired wavelengths, the instrument 11 includes in each of modules 13 through 15, a plurality of light emitting diodes (LEDs) which are energized by electrical circuitry contained in housing 12. Additionally, modules 13 through 15 each include a light responsive sensor arranged to receive the light reflected from or transmitted through a test object with housing 12 containing further circuitry for developing electrical signals in response to the sensor output and output means for displaying the level of the detected light.

Instrument 11 can be utilized in a variety of measurements. One particular and important use is in the measuring of differential reflectance at two or more specific light frequencies or wavelengths. For this purpose, a module 13 may include at least two LEDs, selected to provide different wavelength emissions. In this particular embodiment, there are provided two sets of LEDs, shown respectively as 16a–c and 17a–c, each set including three LEDs of the same or substantially the same frequency, with each set functioning as a unit to provide greater intensity and uniformity of light emission. In this embodiment, a light sensor 18 is arranged centrally of a circular ray formed by the LEDs within module 13. The differential reflectance measurement is accomplished by alternately energizing the two separate sets of LEDs, namely 16a–c and 17a–c, such that alternate emissions of a particular light wavelength are directed outwardly through an axial end aperture 19 of module 13 toward a test material or test object 21, here in the form of a plant leaf. Light reflected from test object 21 is returned to module through aperture 19 and impinges upon sensor 18 which is capable of responding to the two light frequencies employed. As explained more fully herein, the output of sensor 18 is processed by electronic circuit means contained in housing 12 and an output signal is registered, the level of which may be shown on a display means such as a meter, indicating the amplitude of the relative reflectance existing at the different light wavelengths. By rapidly alternating emissions from the two sets of LEDS, sensor 18 receives in quick succession reflected light at the two different wavelengths from the same test object and under identical conditions, such that no variables exist except the variation in the light frequency.

In this manner, an accurate relative light reflectance measurement is achieved without necessitating the controlled conditions required in a laboratory. Instrument 11 may be carried and employed in the field to take these measurements and achieve accurate, reliable photometric information under non-laboratory conditions.

It is observed, that this device eliminates the costly, and critical components usually found in sophisticated spectrophotometers, such as expensive broad band light sources, power supplies, filters and optics. With instrument 11, any of the variations or variables affecting the measurement are automatically compensated for in the following manner. The variables such as temperature variations, external light, etc. can change the result or cause an error in any absolute measurement. However, with the present method and apparatus, these errors affect the measurement for both light wavelengths such that the ratio of reflectance between the two involved light frequencies remains the same. It is the ratio of the reflectance or the differential reflectance which is registered by the display means responsive to light sensor 18.

Figure 3:
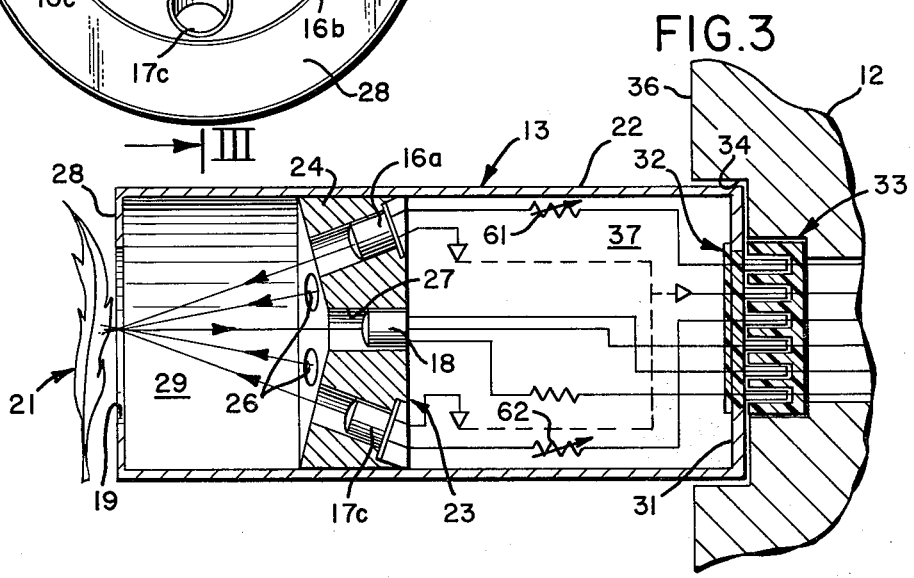
FIG. 3 is a vertical sectional view of the module of FIG. 2 taken generally along III—III therein.

In particular, each of modules 13 through 15 may take the form of an elongated hollow cylindrical body 22 as shown for module 13, having an LED and sensor assembly 23 mounted generally centrally and interiorly thereof as best shown in FIG. 3. This assembly includes a cylindrical mounting member 24 formed with a plurality of generally axially extending and radially outwardly set openings 26 sloped to converge toward the forward end of body 22 which includes aperture 19. The plurality of light emitting diodes 16a–c and 17a–c are individually mounted within each of holes 26 as illustrated in FIG. 3 so as to direct their respective light emissions forwardly toward and through aperture 19.

A centrally located and axially aligned hole 27 is provided for mounting light sensor 18 in the manner illustrated to receive light reflected back through aperture 19 generally along the central axis of the module body.

Aperture 19 is defined by a radially inwardly extending flange 28 at the forward end of body 22, such that flange 28 serves as a shroud to prevent stray light, other than that reflected by test object 21, from entering a forward chamber 29 between the apertured forward end of body 22 and assembly 23.

A rear end of cylindrical body 22 is provided with a transverse closure 31 to which is mounted a multi-pin electrical male connector 32 for cooperating with a mated female electrical connector 33 carried by instrument housing 12 within a circular recess 34 in a front housing wall 36, with the rear axial end of body 22 being adapted to nest within recess 34 upon mating of connectors 32 and 33 as illustrated. A rear chamber 37 defined within body 22 between assembly 23 and closure 31 serves to house electrical components and wiring connected between the LED light sources and sensor of assembly 23 and connector 32.

In this particular and preferred embodiment, housing 12 is of a generally elongated rectangular shape having a control panel 39 disposed along one side thereof for controlling and adjusting the electrical drive circuitry and output circuitry of the instrument. At a rear end wall 41 of the housing, a display means, here in the form of a meter 42, is provided for visually registering such measurements as differential reflectance. Although instrument 11 may be hand held while in use, it is in this instance mounted on an adjustable tripod 43 so as to be steadied thereby much like a camera mounted tripod. The housing 12 may be detachably connected to tripod 43 by conventional means.

Light emitting diodes are now available in a wide variety of wavelengths, and each of modules 13, 14 and 15 can be provided with various combinations of wavelengths selected from the following representative list of wavelengths offered by LED manufacturers:

Green — 570.0 nanometers
Yellow — 589.0 nanometers
Amber — 610.0 nanometers
Red — 650.0 nanometers
Red — 660.0 nanometers
Red — 700.0 nanometers
Infrared — 820.0 nanometers
Infrared — 900.0 nanometers
Infrared — 940.0 nanometers Depending upon the application, for a module constructed in accordance with module 13 shown in the drawings and described above, a selection of two different wavelengths from the above list would be made, and three LEDs of each such wavelength would be employed for diodes 16a–c and 17a–c respectively. Modules 14 and 15 may similarly be provided with a different and desired combination of these diode wavelengths.

Figure 4:
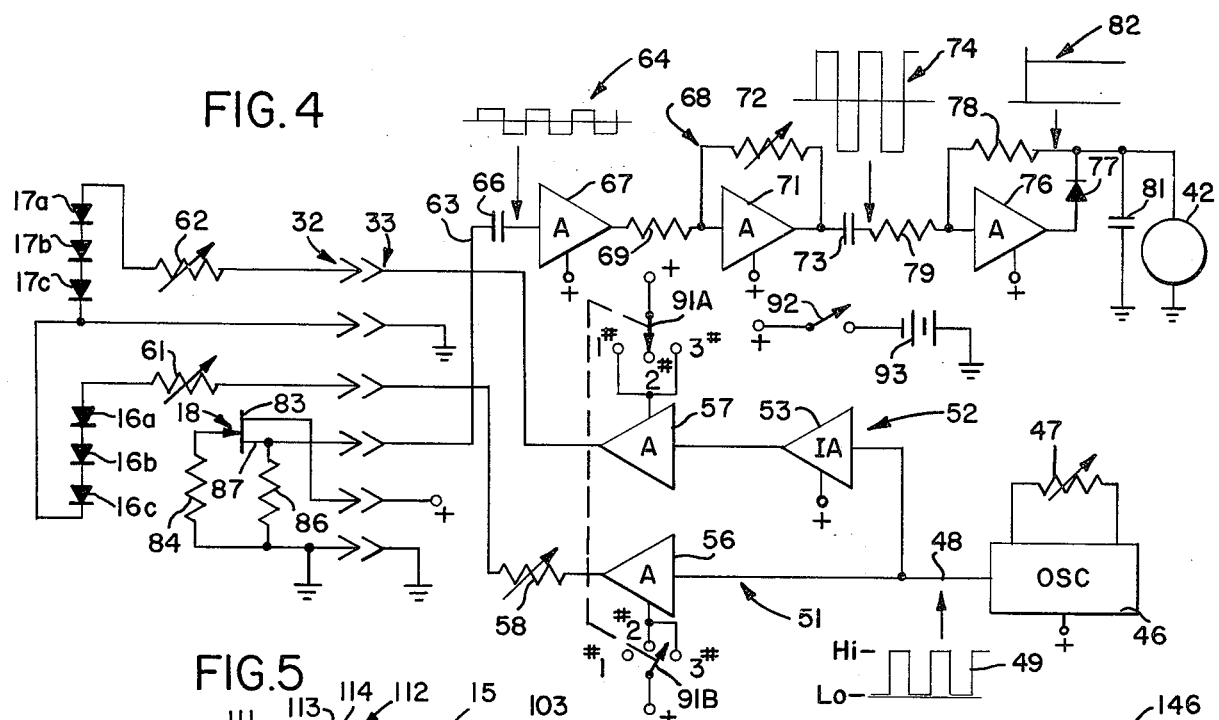
FIG. 4 is a schematic diagram of the electrical drive and output circuitry utilized in the instrument shown in FIG. 1 for performing the various light measurements.

Referring now to FIG. 4, instrument 11 is provided with circuit means for alternately or sequentially driving each of the light emitting diodes mounted in the detachable module. More particularly, the circuit means may be provided in the form of a multi-vibrator or oscillator means for alternately energizing the two different wavelength sets of LEDs provided by LEDs 16a–c and 17a–c such that these devices produce light emissions which are 180° out of phase with one another. Although the rate at which the LEDs are alternately driven is not believed to be critical, it may be relatively rapid, for example, a rate of 1 kilohertz has been found suitable.

Thus, the test object 21 sees in rapid succession light emissions from the two different sets of diodes, each at a different wavelength, and similarly, light sensor 18 and the output circuitry therefrom receive a corresponding, rapid variation in the difference of reflectance, if any, between the two wavelengths.

In this particular embodiment as shown in FIG. 4, the drive circuit means is provided by a solid state multivibrator oscillator 46 having a variable resistor 47 associated therewith to provide means for adjusting the duty factor of the oscillator output which appears on output line 48. A rectangular or square output wave form 49 is thus developed, in which variable resistor 47 provides for changing the time ratio between the high and low levels of the output signal for a full cycle thereof. This variation in turn sets the ratio of the time during which each set of LEDS is energized with respect to a full cycle of operation.

The oscillator output is jointly fed to a drive circuit 51 associated with LEDs 16a–c and another drive circuit 52 associated with LEDs 17a–c as illustrated. This arrangement provides for alternately turning on and off the two different sets of diodes depending on whether the wave form 49 is high or low. More particularly, this is achieved by including an inverting amplifier 53 in the path of drive circuit 52, such that the pair of drive amplifiers 56 and 57 of the two different drive circuits 51 and 52 are alternatively driven at the inputs thereof.

The output of amplifier 56 is connected through a variable resistor 58 and through connectors 32 and 33 to and for jointly energizing the set of LEDs 16a–c which are serially connected as illustrated. Similarly, the serially connected set of LEDs 17a–c is driven from the output of amplifier 57 connected thereto through connectors 32 and 33. A pair of equalizing or compensating resistors 61 and 62 may be advantageously provided in the respective circuits associated with the two different sets of LEDs and located within each module, such as module 13 in this instance, to compensate for differences among the light emitting diodes so that an equal drive current from the instrument housing produces the same intensity of light emission for all of the modules. The instrument may be calibrated in the factory and the values for these resistors may be set during manufacture.

Output circuit means is provided for responding to the signal developed by sensor 18 and developing an output signal which may be displayed on a display means, such as meter 42. Although a meter is illustrated in this embodiment, any suitable output display means may be used, such as an oscilloscope, digital readout, etc.

If the intensity of the reflected light from both wavelength sources is equal, the signal developed by sensor 18 will be a DC level signal with no modulation which may be set to display a zero reading on meter 42. Usually however, the reflectance from the test object 21 will exhibit a variation between the different wavelengths and an AC or modulated DC signal will appear on the output line 63 from sensor 18. This situation is illustrated by wave form 64 with the DC component removed by a blocking capacitor 66.

An alternating current signal at a frequency of 1 kilohertz is thus produced, the amplitude of which varies as a function of the difference in reflectivity between the two wavelengths.

The output circuit means in this instance is provided by an amplifier 67, and from there through a variable gain circuit 68 provided by an input resistor 69, an operational amplifier 71, and a variable feedback resistor 72 as illustrated. Circuit 68 serves to adjust the output gain to a desired level.

Having been amplified, the alternating current signal is passed through a capacitor 73 and appears as an amplified signal wave form 74. At this point, the alternating current signal is rectified and applied to meter 42 or to some other display means to register an output level corresponding to the amplitude of the alternating current signal shown in wave form 74 which is representative of the output level of light sensor 18.

The signal rectification means is provided in this instance by an amplifier 76, a diode 77 connected in series with the amplifier, a feedback resistor 78, an input resistor 79 and a filtering capacitor 81. The rectified signal thus appears as wave form 82, which is a DC level signal having an amplitude proportional to that of the AC signal shown in wave form 74. Meter 42 displays this DC signal level.

Light sensor 18 may be provided by a number of photosensitive or light sensitive devices which are spectrally sensitive to the wavelengths used. It is desirable that the sensitivity of the detector as a function of wavelength be reasonably uniform over the wavelength interval of interest. However, slight differences in sensitivity are easily tolerated by adjusting the individual drive circuits by means such as resistors 61 and 62 so as to compensate for any sensitivity differences. Suitable devices for the sensor include a solar cell of about 1 square centimeter in size, a PIN diode, or as employed in the presently disclosed embodiment, a photosensitive field effect transistor 83.

Transistor 83 is connected as illustrated with a gate resistor 84 and a source resistor 86 to provide an output signal at electrode 87 which is extended to line 63 via connectors 32 and 33 to provide the sensitivity signal to the output circuit means.

To provide for individually adjusting the drive and response for each set of light emitting diodes, a switching means is provided for individually turning on and off the drive amplifiers 56 and 57 associated with the drive circuits 51 and 52. In this instance, the switching means is provided by a rotary ganged switch 91 having sections A and B as illustrated.

In preparing the instrument for measuring differential reflectance the following procedures may be followed. Switch 91 A and B is rotated to position 1 so as to disable drive circuit 51 and enable oscillator 46 to energize the set of diodes 17a–c through amplifier 57. The effective gain of the received reflectance signal is now adjusted by means of variable resistor 72 such that the instrument can be calibrated by placing a test object of known or standard reflectivity in front of the sensor module and adjusting the output gain so that meter 42 is set to any desired level. For example, if a 98 percent reflective material is employed as the calibrating test object, the meter would be set to 98 on a 100 scale. Subsequent material measurements would thus read at or very near absolute reflectance, absorption and/or transmission depending upon the stimulus.

Having completed the foregoing calibration steps, switch 91A and B is rotated to position 2 so as to disable amplifier 57 and enable amplifier 56 for driving diodes 16a–c via drive circuit 51. The effective response of the system may now be adjusted by variable resistor 58 which controls the drive current to light emitting diodes 16a–c. The absolute reflectance of light emissions from diodes 16a–c may thus be set by again using a test object of known reflectivity and adjusting resistor 58 to cause the reading on meter 42 to assume the proper level. It may be desirable to do this in order to perform individual reflectance measurements at the specific wavelengths provided by the two sets of diodes on an individual basis.

Alternatively, to ready the system for a differential reflectance measurement, the switch 91 A and B is moved to position 3 and is calibrated against a test object having equal reflectivity at the two wavelengths associated with the two different sets of diodes. More particularly this is achieved by placing such a test object in front of the sensor module and adjusting resistor 58 to balance or null (zero) the meter reading. All subsequent test materials measured by the instrument and having the same reflectance at the test wavelengths will register a "zero" reading. However, objects in which the reflectance is different at the different wavelengths will cause a reading on meter 42 proportional to this difference. The meter reading may be used in this manner to provide both quantitative and qualitative measurements.

A switch 92 may be provided for turning on and off a power source, such as a battery 93 for operating the instrument circuitry. Manual controls for switch 92, switch 91A and B, variable resistors 47, 58 and 72 may be provided on control panel 39 of the instrument as illustrated in FIG. 1.

As an example of one application of instrument 11 and module 13, differential reflectance measurements may be performed on a plant leaf. By the foregoing construction and operation of instrument 11, two wavelength measurements are made, alternately and rapidly, at two points on a reflectance curve showing the level of reflectance as a function of wavelength. In the case of the plant leaf, the light emitting diodes of module 13 are selected such that one of the two wavelengths involved lies within a wavelength band in which water exhibits significant light absorption. The other wavelength is selected to lie outside of this absorption band associated with water content. In this way, physical changes that affect the reflectance at one measurement point and not the other will cause a resultant differential reflectance measurable on the meter of instrument 11. A healthy, wet leaf having substantial water content will exhibit a measurable difference in reflectance at the water absorption wavelength relative to the reference wavelength placed outside of the absorption band. On the other hand, a dry, unhealthy leaf will show only a slight variation in reflectance between the two wavelengths.

Quantitative and qualitative analysis of leaf samples can be effectively obtained in the following manner. First, using a healthy, wet leaf as a test object, instrument 11 is adjusted in the manner above described to obtain a null or zero differential reflectance. Actually, as above indicated, there will be a significant difference in the absolute reflectance, however for the purposes of a reference or standard, this absolute difference is balanced out.

Now, measurements may be performed on plant leaf of unknown condition, and any significant deviation from the standard will be registered as a non-zero reading on the meter.

Another measurement method provided for an adjustment of the instrument to read "100%" for a single wavelength emission on a known plant leaf test object, then nulling the instrument using both wavelengths, and finally, employing the instrument to detect deviations in the percentage differential reflectance from norm for unknown samples.

As an example of the light wavelengths involved in measuring a plant leaf for water content, the reflectance at 700 nanometers will not show a significant deviation between normal and diseased plant material, whereas at 900 nanometers there is a significant differential between the normal and diseased.

Figure 5:
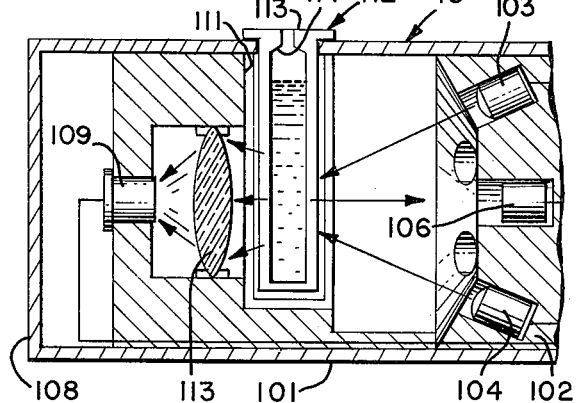
FIG. 5 is a vertical sectional view of an alternative embodiment of the source and sensor module shown in FIGS. 2 and 3, this particular module adapted to measure the transmission of light through a test object at the particular LED emission wavelengths.

With reference to FIG. 5, one or more of the modules associated with instrument 11 may be constructed to provide for measuring light transmission and/or absorption of test material. In this instance, module 15 provides for directing light of different wavelengths through a test sample such that the light emissions transmitted thereby impinge upon a photosensor located on an opposite side of the sample from the light emitting diodes. In this manner, absolute and differential light transmission measurements may be performed. Additionally, module 15 may be provided with an additional photosensor, arranged like sensor 18 of module 13 on the same side of the test sample as the light emitting diodes so as to measure the absolute and differential reflectance of the specimen. By providing such means in a single module, such as module 15, the output signals from both photosensors may be electrically summed and subtracted from a value representing the total light emitted by the various diodes, whereby the resulting value will represent the absolute or differential absorption of the test sample.

More particularly in the disclosed embodiment, module 15 includes a hollow cylindrical body 101 having a source and sensor assembly 102, similar to assembly 23 of module 13. For example, assembly 102 as illustrated may include a plurality of light emitting diodes 103 and 104 of different wavelengths and a sensor 106 located centrally thereof to receive reflected light from the test piece. With reference to FIG. 1, a rear end of module 15 may be provided with a connector 107, similar to connector 32 of module 13 for detachable connection to a mating connector 33 of housing 12.

A forward end of the hollow cylindrical body 101 of module 15 is closed by transverse wall 108 and immediately interiorly thereof another light sensor 109 is mounted to receive light emissions directed forwardly of the instrument from LED sources 103 and 104. Intermediate photosensor 109 and assembly 102 is a specimen receiving opening 111 transversely of body 101 for accepting a test specimen or test object 112 as indicated in FIG. 5. A lens assembly 113 may be mounted between opening 111 and photosensor 109 to collect any light transmitted by the test object and focus such light onto the forward sensor. Any light reflected off of the test object 112 is returned to sensor 106 for developing an output signal representative of the reflectance as in the case of sensor 18 of module 13.

One particular application of module 15 is to measure the characteristics of liquids, such as the oxygen content in blood. For this purpose, a fluid container may be provided in the form of a transparent plastic receptacle 113 having an internal chamber 114 for receiving and containing the liquid.

Module 15 may be used in conjunction with the same circuitry as shown in FIG. 4 for measuring differential and/or absolute transmission of light through the test object. In such case, the output of sensor 109 is connected as sensor 18 shown in FIG. 4 so as to develop an input signal on line 63 which is processed by the output circuit means to develop a reading on meter 42. If it is desired to employ module 15 for measuring the differential and/or absolute reflectance in addition to the transmission measurements, then an additional output circuit would be provided within housing 12 to receive the output of sensor 106. Alternatively, an additional switch may be provided for alternately selecting the output of either sensor 109 or sensor 106 and applying the selected signal to the single output circuit means shown in FIG. 4 at line 63.

Figure 6:
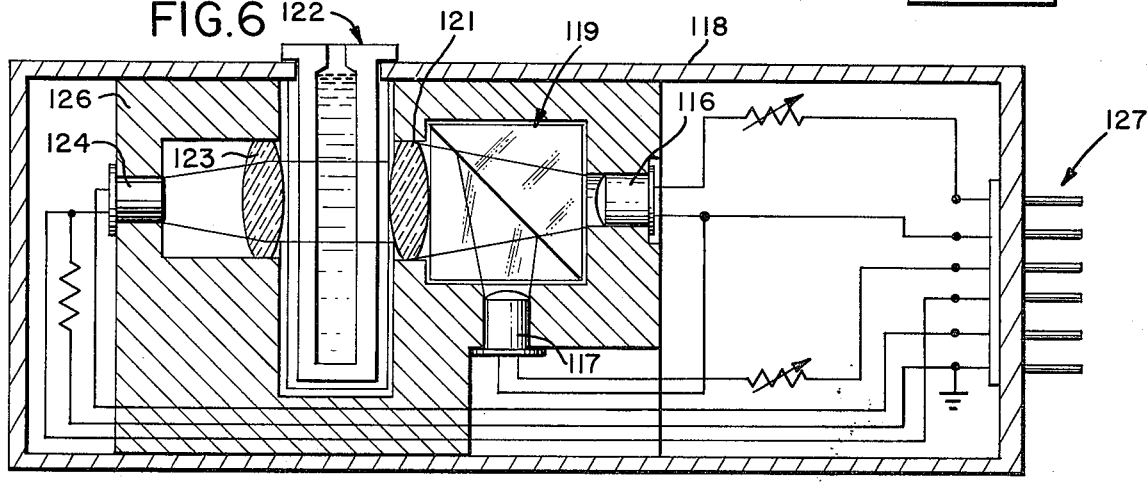
FIG. 6 is a further alternative embodiment of a source and a sensor module, shown in section, and similar to the module of FIG. 5 in that this module is also adapted to measure the transmission of the light frequencies through the test sample.

In FIG. 6, a still further alternative module is shown for measuring the light transmission characteristics of a test object or specimen. In this embodiment, a pair of light emitting diodes 116 and 117 are mounted generally at right angles to one another within a hollow cylindrical module body 118, and a cube beam splitter 119 is provided for receiving and combining the two different wavelength light emissions from the pair of diodes 116 and 117. The combined light frequencies are directed forwardly of the module and a lens assembly 121 provides for converging the light energy and directing it through a test object 122, which may be constructed similarly to test object 112 to provide a transparent plastic container for storing a liquid, such as a blood sample therein.

Any of these wavelengths of light transmitted by object 122 are collected in a converging lens 123 which focuses the light energy onto a photosensor 124 as indicated. All of these components may be arranged and held in place by a mounting member 126 positioned within hollow body 118. The drive signals for LEDs 116 and 117 and the output signal from sensor 124 are communicated with a connector 127, which like connector 32 mates with the connector 33 carried by housing 12.

Accordingly, the drive circuit means of FIG. 4 provides for alternately energizing light emitting diodes 116 and 117 and the light transmitted by the test object in response to these emissions is impingent upon sensor 124 which thereupon develops an output signal representing the differential transmission.

With respect to the latter two embodiments shown in FIGS. 5 and 6, it has been found that the oxygen content in blood can be accurately determined by photometric means. Moreover, the instrument of the present invention provides a quick and convenient method and apparatus for quantitative and qualitative determinations of the oxygen content by sampling the absorption characteristics at particular light wavelengths. The absorption measurements can be obtained by first measuring the transmission of the light emissions with a clear sample positioned in place of test object 112 or 122 to develop a reference level. Thereupon the actual blood sample may be introduced as test objects 112 and 122 and the differences between the reference measurements and the actual sample measurements can be used to determine the amount of absorption.

Figure 7:
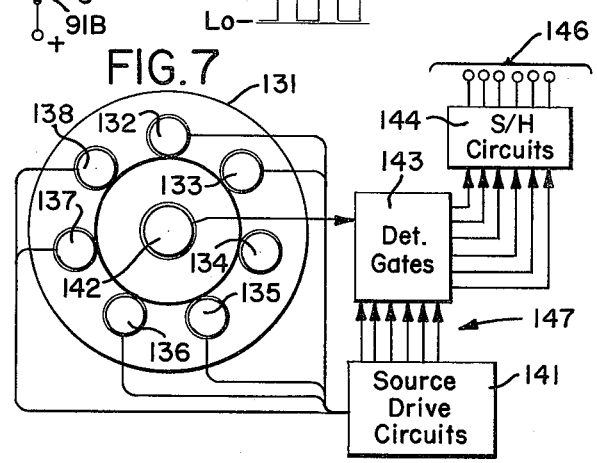
FIG. 7 is still another alternative embodiment of the present invention, in which a plurality of light emitting diodes of different wavelengths are sequentially energized by a drive circuit and the response by a light sensor to emissions from each of these LEDs is received and electrically registered at an output circuit.

In FIG. 7, another alternative of the present invention is schematically illustrated in which a plurality of different light wavelengths are used in a single module 131. Module 131 may be similar to module 13 described above, except that instead of using six light emitting diodes to produce two different light wavelengths as in the case of module 13, the six light emitting diodes 132, 133, 134, 135, 136, 137 and 138 each have a different characteristic wavelength. These six different LEDs are sequentially energized by drive circuit means capable of producing a series of six drive signals in sequence and in rapid successions. For this purpose, source drive circuits 141 may be provided with a ring counter driven by an oscillator or free-running multi-vibrator to produce the succession of drive signals.

A single, common photosensor 142 may be provided, like sensor 18, for responding to the reflectance or transmission of the emitted light from each LED source. The output of sensor 142 is thus a succession of light responsive signals which may vary in level depending upon the light reflectance or transmission characteristics of each of the involved wavelengths. This composite output signal is passed from sensor 142 to an output circuit means which samples each output level during the interval that each LED source is energized and stores these various signal levels.

More particularly, the circuit means may be provided by a plurality of detection gates 143, including six channels, one for each light source. These six channels are sequentially opened in synchronism with the energization of the various sources and the output signal provided by sensor 142 during each such interval is stored by a plurality of sample and hold circuits 144. Circuits 144 have a plurality of outputs 146, one for each LED source for registering the holding the output signal level on sensor 142 associated with each of the six different wavelengths. These output signals may be used to plot a chart or a spectrum of the function of differential reflectance, transmission and/or absorption as they vary with respect to a changing wavelength.

If a ring counter is employed to provide the sequential energization of the diode sources, the outputs from such a counter may be extended over connecting lines 147 to and for operating the six channels of gates 143 in synchronism with the associated diode emissions. The drive and output circuit means employed in the embodiment shown in FIG. 7 may be mounted within housing 12 in the same manner that the FIG. 4 circuit is contained in the instrument housing.

Although six LEDs light sources and associated channels are illustrated here, any desired number of light sources may be employed.

In addition to the above-mentioned applications of method and apparatus in accordance with the concepts disclosed herein, there exists the following potential uses. The ability to measure water content may be employed to improve the efficiency of irrigation and thus aid in the conservation of water. For example, irrigation can be timely applied for maximum plant growth by means of monitoring the plant water content with the presently disclosed instrument.

Furthermore, the health of a plant can be quickly and easily monitored with early detection of plant problems caused by disease or otherwise.

In the field of hydroponics, where the most efficient operation depends upon the control of applied nutrients and water only in response to the requirements of a plant, the present instrument will be most beneficial in ascertaining the needs of the plant.

Light reflectance measurements can be performed on a crop to determine the most advantageous time for harvesting.

Other major applications include medical diagnostics, one example of which is the above-described measurement of oxygen content in blood.

While only a limited number of embodiments of the present invention have been disclosed herein, it will be readily apparent to persons skilled in the art that numerous changes and modifications may be made thereto without departing from the spirit of the invention. Accordingly, the foregoing disclosure and description thereof are for illustrative purposes only and do not in any way limit the invention which is defined only by the following claims.

I claim:

1. Apparatus for measuring light reflectance, transmission and/or absorption of a test object at different light wavelengths, comprising:

a plurality of light emitting diodes disposed to direct light emissions toward the test object, said plurality of light emitting diodes including two sets of diodes with one set emitting light of one wavelength and the second set emitting light of a different wavelength;

at least one light sensor disposed to receive light emanating from said test object, said light being a function of the characteristics of the test objects;

drive circuit means connected to and for alternatedly energizing said two sets of said plurality of light emitting diodes such that said light emissions of different wavelengths are produced at alternately different times;

means coupled between said drive circuit means and one set of said diodes of one wavelength for adjusting the drive level of the signal from said drive circuit means to said certain of said diodes of one wavelength to facilitate calibration;

output means conneced to said sensor means for registering a measurement of the light emissions received by said sensor means; and means coupled to said output means for adjusting the signal gain in said output means to facilitate calibration.

2. The apparatus of claim 1, said drive circuit means being connected to and for energizing said two sets of diode such that said two different light wavelengths are alternately produced, and said output means including alternating current amplification means for receiving and amplifying an alternating electrical signal from said sensor means representing the variation in the electrical output therefrom caused by said different light wavelengths.

3. The apparatus of claim 2, said drive circuit means being connected to and for alternately energizing each set of light emitting diodes such that the plurality of diodes within each set are jointly and simultaneously energized, whereby each set of light emitting diodes produces a relatively high intensity light emission at the associated wavelength.

4. The apparatus of claim 2 further comprising:

switch means for selectively enabling one set of diodes associated with one of the wavelengths and disabling the second set of diodes associated with the other wavelength whereby light emissions at each of the sets of diodes may be independently adjusted and calibrated.

5. The apparatus of claim 1, further comprising:

an additional light sensor means, one of said light sensors being disposed to receive light reflected by said test object and the other said light sensor means being disposed to receive light transmitted by said test object; and said output means being connected to both said sensor means for registering measurements of the amount of light received by each of said sensor means, whereby measurements of the light reflectance and light transmission can be utilized to provide a measurement of absorption.

6. The apparatus of claim 1, said plurality of light emitting diodes being selected to provide light emissions of a corresponding plurality of different wavelengths;

said drive circuit means being connected to and for alternately and sequentially energizing said diodes such that said light emissions of different wavelengths are sequentially produced;

said output means comprising a plurality of sample and hold circuit means for each diode wavelength for receiving and storing the output signal from said sensor means during the light emission from the diode of the associated wavelength, whereby a plurality of output measurement signals are registered by said sample and hold circuit means as a function of the various wavelengths produced by said light emitting diodes.

7. An instrument for performing measurements of light reflectivity, transmission and/or absorption, comprising:

an instrument housing;

a plurality of modules each having at least one light source and one light sensor and each having electro-mechanical connection means for detachable connection to said housing;

said at least one light source including two sets of light emitting diodes each associated with and mounted in each of said modules for directing light emissions therefrom toward a test object;

impedance adjustment means mounted in each of said modules and coupled to the associated plurality of light emitting diodes whereby the light intensity of each of said sets of light emitting diodes may be adjusted to permit the attainment of uniform illumination by each of said modules;

said at least one light sensor mounted in each of said modules along with said light emitting diodes for receiving light emanating from said test object, said light being a function of characteristics of said test object; and circuit means mounted in said housing and connectable to said two associated sets of diodes and said sensor of each of said plurality of modules for providing electrical drive signals for alternately exciting said two associated sets of diodes to cause light emission therefrom and for receiving and developing a measurement signal in response to an electrical output from said sensor representing the amount of light received thereby.

8. The instrument of claim 7 and wherein at least one diode of one set of each of said two sets of light emitting diodes is operative to provide light of a different wavelength than the diodes in the other set of light emitting diodes.

9. The apparatus of claim 7, at least one of said modules comprising means for receiving a test object in a position such that light emissions from said plurality of diodes is at least partially transmitted through the test object before impinging on said sensor, whereby light transmission measurements can be performed on said test object.

10. A method of measuring light reflectance, transmission and/or absorption at different wavelengths, the steps comprising:

selectivity and alternately energizing a plurality of light emitting diodes having light emissions of different wavelength;

reflecting said light emissions from said diodes with respect to a test object and receiving said reflected light emissions at a light sensor to produce an alternating current electrical output signal having an amplitude representing the difference in reflectivity of the test object as a function of the different wavelengths to produce a differential light reflectance signal;

receiving the electrical signal produced by said sensor means in response to the diode light emissions reflected by the test object; and rectifying the alternating current signal to produce a direct current signal to be displayed as a measure of said differential light reflectance signal.

11. The method of claim 10, and further comprising the step of amplifying said alternating current signal to produce a signal of amplitude proportional to the differential light reflectance of the test object at the differential wavelengths of light.

* * * * *